United States Patent [19]

Fujimaga

[11] Patent Number: 5,471,403
[45] Date of Patent: * Nov. 28, 1995

[54] METHOD FOR PREDICTING THE THREE-DIMENSIONAL TOPOGRAPHY OF SURFACES OF SEMICONDUCTOR DEVICES AFTER REFLOW PROCESSING

[75] Inventor: Masato Fujimaga, Hyogo, Japan

[73] Assignee: Mitsubishi Denki Kabushiki Kaisha, Tokyo, Japan

[*] Notice: The portion of the term of this patent subsequent to Mar. 8, 2011, has been disclaimed.

[21] Appl. No.: 846,702

[22] Filed: Mar. 6, 1992

[30] Foreign Application Priority Data

Mar. 8, 1991 [JP] Japan ................. 3-043258

[51] Int. Cl.$^6$ ............. G01B 21/20; G06F 17/10; G06T 17/20
[52] U.S. Cl. ............. 364/488; 364/489; 364/490; 364/578
[58] Field of Search ................. 364/578, 552, 364/490, 488, 489; 204/180.9, 192.33

[56] References Cited

U.S. PATENT DOCUMENTS

| | | | |
|---|---|---|---|
| 4,969,116 | 11/1990 | Wada et al. | 364/578 |
| 5,067,101 | 11/1991 | Kunikiyo et al. | 364/578 |
| 5,070,469 | 12/1991 | Kunikiyo et al. | 364/488 |
| 5,097,432 | 3/1992 | Harada et al. | 364/578 |
| 5,245,543 | 9/1993 | Smayling et al. | 364/490 |
| 5,260,882 | 11/1993 | Blanco et al. | 364/578 |
| 5,293,557 | 3/1994 | Fujinaga et al. | 364/578 |
| 5,307,292 | 4/1994 | Brown et al. | 364/578 |
| 5,307,296 | 4/1994 | Uchida et al. | 364/578 |

OTHER PUBLICATIONS

Leon, "Numerical Modeling Of Glass Flow And Spin-On Planarization", IEEE Transactions On Computer-Aided Design, vol. 7, No. 2, 1988, pp. 168–173.

Fujinaga et al, "3D–Numerical Modeling Of Reflow Of Insulating Thin Film Using Surface Diffusion", Institute Of Electronics, Information, and Communication Engineers, 1991, pp. 1–9.

Chuang et al, "The Shape Of Intergranular Creep Cracks Growing By Surface Diffusion", Acta Metallurgica, vol. 21, 1973, pp. 1025–1028.

Primary Examiner—Kevin J. Teska
Assistant Examiner—Tyrone V. Walker
Attorney, Agent, or Firm—Leydig, Voit & Mayer

[57] ABSTRACT

A method of predicting the three-dimensional topography of a surface of a semiconductor device including a flowable material includes establishing reflow process conditions including a total process time; establishing a grid of three-dimensional cells encompassing at least part of a semiconductor device and including a flowable material; specifying the concentration of a flowable material in each cell; establishing polygonal surfaces of constant flowable material concentration that extend amongst the cells; calculating the chemical potential of each constant concentration polygonal surface; calculating the surface flux of flowable material between adjacent polygonal surfaces; calculating the material flow between cells for a time interval $\Delta t$ less than the process time by multiplying the surface flux by the time $\Delta t$; determining the flowable material concentration in each cell after the material flow; repeating the foregoing steps from establishing the polygonal surfaces of constant concentration through determining the flowable material concentration in each cell for successive time intervals $\Delta t$ until the sum of the time intervals reaches the specified process time; and, thereafter, establishing as the three-dimensional surface of the flowable material a surface of constant concentration of the flowable material.

1 Claim, 8 Drawing Sheets

METHOD FOR PREDICTING THE THREE-DIMENSIONAL TOPOGRAPHY OF SURFACES OF SEMICONDUCTOR DEVICES AFTER REFLOW PROCESSING

FIELD OF THE INVENTION

This invention relates to a method of predicting the three-dimensional shape of a surface of a semiconductor device after a reflow process in which a flowable material disposed on the device is caused to flow.

BACKGROUND OF THE INVENTION

In semiconductor device processing, non-planar surfaces are produced when features, such as electrodes, insulating layers, and other three-dimensional elements, are formed on semiconductor substrates. The resulting non-planar surfaces present difficulties in subsequent processing steps, such as the deposition of wiring stripes, in the manufacture of semiconductor devices. Therefore, it is known in the art to deposit materials on the devices in order to produce a planar or nearly planar surface to improve the yield after subsequent processing.

Among the techniques employed for "planarization" is the application of glasses, such as phosphosilicate glass (PSG), borophosphosilicate glass (BPSG), and spin-on glasses (SOG). These planarization materials are flowable, i.e., tend to flow slowly when raised to a sufficiently high temperature. The flow tends to fill valleys so that a surface of improved planarity is obtained.

In order to obtain a desired surface configuration after the deposition of a planarization material and its reflow, it is helpful to predict the surface configuration based upon the initial surface configuration, the characteristics of the flowable material, and the reflow conditions. An example of a method of predicting a two-dimensional surface topography resulting from the flowing of a flowable material is described by Leon in "Numerical Modeling of Glass Flow and Spin-on Planarization", IEEE Transactions on Computer Aided Design, Volume 7, Number 2, February 1988, pages 168–173, which is incorporated herein by reference. The method described by Leon employs a surface diffusion material flow theory to predict how a two-dimensional surface profile will change as a function of time in an attempt to minimize the surface energy. The diffusion is driven by the chemical potential gradient at the surface of a two-dimensional structure. Whenever the gradient is present and conditions favor diffusion, the flowable material will move, changing the configuration of the surface. The greater the chemical potential gradient, the more rapid the flow for other fixed conditions, e.g., temperature.

Leon's model is described with reference to FIGS. 9–12. In FIG. 9, a BPSG body 1 has a surface 2 and is disposed on a substrate 3. The glass includes a central opening 4 at the surface of the substrate. The BPSG may have been deposited by any known technique followed by etching to prepare the opening 4. In the Leon two-dimensional model, a plurality of points 5 are established at spaced intervals along the surface of the BPSG 1 and the exposed surface of the substrate 3 at the opening 4 in the BPSG 1. Adjacent pairs of points 5 are connected by line segments 6, sometimes referred to as strings. If the temperature of the BPSG 1 is raised higher than about 600° C., the BPSG can flow. In the flow process, treated by Leon as a surface diffusion process, sharp edges tend to become smooth and depressions tend to be filled. Each of the points 5 on the surface of the BPSG 1 can be considered, in combination with its two closest neighbors, to lie along a radius of curvature. An example is one of the rectangular corners shown within the area A of FIG. 9 is shown in greater detail in FIG. 10. The point 5 at the corner has a radius of curvature R. As the BPSG 1 flows and the sharpness of the corner is lost, the radius of curvature of the point 5 initially at the corner increases as a result of the flow, i.e., surface diffusion. Typically, a positive radius of curvature is assigned to points 5 like those at an outside corner, such as is shown in FIG. 10. A negative radius of curvature is assigned to points at inside corners, such as the point of intersection of the substrate 3 in the opening 4 with the BPSG 1 shown in FIG. 9.

According to the Leon method and well known surface diffusion theory, whenever the radius of curvature of a surface is less than infinite, i.e., when the surface is non-planar, there is a gradient in the chemical potential across the curved surface proportional to the surface free energy $\gamma$, i.e., the surface tension. The total free energy, F, of an area equals $\gamma A$ where A is the total area and $\gamma$ is the surface free energy per unit area. The local chemical potential at a particle N on a surface equals the derivative of the surface free energy with respect to the number of particles. Applying these relationships, $$\mu = (dF/dN) = \gamma(dA/dN) = \gamma\Omega((1/R_1) + (1/R_2)).$$

In the foregoing equation, $\Omega$ is the atomic or molecular volume of the atoms or molecules, i.e., the diffusing species, making up the surface. $R_1$ and $R_2$ are local radii of curvature for points in a small area dA of a curved surface. The radii are perpendicular to the surface and are not parallel if the surface is not planar. When the surface is not planar, the local chemical potential will vary over the surface, resulting in a gradient in the chemical potential that will cause the diffusion of material depending upon external conditions, such as temperature and pressure. It is well known that the flux is proportional to the rate of change of the curvature, i.e., $$J = (D/kT) \nabla(\mu\nu\Omega) = (D\nu\Omega/kT)\nabla\mu = (D\gamma\nu\Omega^2/kT) \nabla_s((1/R_1(s)) + (1/R_2(s))),$$

where J is the two-dimensional flux, $\nu$ is the surface concentration of the diffusing species, D is the coefficient of surface diffusion, k is Boltzmann's constant, T is the temperature, and $\nabla_s$ indicates the gradient with respect to distance along the curved surface. $R_1(s)$ and $R_2(s)$ are functions describing the radii of curvature $R_1$ and $R_2$, respectively, in orthogonal directions as illustrated in FIG. 12. In other words, along the edge 7 of the unit surface shown in FIG. 12, $R_2$ is the radius of curvature, and along the edge 8, which is generally orthogonal to the edge 7, the radius of curvature is $R_1$.

FIG. 11 illustrates the calculation of the movement of a point $P_{io}$ using the Leon method. The respective radii of curvature at points $P_{io-1}$, $P_{io}$, $P_{io+1}$ respectively are $R_{io-1}$, $R_{io}$, and $R_{io+1}$ so that the flux from point $P_{io-1}$ to $P_{io}$ is given by $$J_{i-1, i} = (-D_o/kT) ((1/R_{i-1}) - (1/R_i))/|P_i - P_{i-1}|$$

where $D_o = D\gamma\nu\Omega^2$.

In FIG. 11, the point $P_{io}$ advances to the point $P_i$ during a time increment $\Delta t$. This movement is based upon the difference in the fluxes at the point $P_{io}$ with respect to points $P_{i-1}$ and $P_{i+1}$.

In order to apply these calculations in the Leon method, the radii of curvature must be calculated after the surface of interest is divided into various lengths, for example, with respect to FIG. 9, after the two-dimensional figure is divided by the grid points 5. Although this technique may be satisfactory for a two-dimensional application such as that shown in FIG. 9 and as described in the article by Leon and for certain special limited three-dimensional situations, in general, it is extremely difficult to apply the Leon method to generalized three-dimensional surfaces. However, as the density of integration of semiconductor devices has increased, particularly in so-called ultra large scale integration (ULSI), it has become increasingly important to predict reflow surface topographies in three dimensions.

SUMMARY OF THE INVENTION

Accordingly, an object of the present invention is the prediction of a three-dimensional surface topography after a reflow process in which the surface configuration of a flowable material changes. The prediction is important so that a desired surface topography of a semiconductor device prepared in a process including a reflow step can be accurately determined to plan further processing steps.

A method of predicting the three-dimensional topography of a surface of a semiconductor device including a flowable material according to the invention includes establishing reflow process conditions, including a total process time; establishing a grid of three-dimensional cells encompassing at least part of a semiconductor device and a flowable material of the semiconductor device; specifying the concentration of a flowable material in each cell; establishing polygonal surfaces of constant flowable material concentration that extend amongst the cells; calculating the chemical potential of each constant concentration polygonal surface; calculating the surface flux of flowable material between adjacent polygonal surfaces; calculating the material flow between cells for a time interval $\Delta t$ less than the total process time by multiplying the surface flux by the time $\Delta t$; determining the flowable material concentration in each cell after the material flow; repeating the foregoing steps from establishing the polygonal surfaces of constant concentration through determining the flowable material concentration in each cell for successive time intervals $\Delta t$ until the sum of the time intervals reaches the specified total process time; and, thereafter, establishing as the three-dimensional surface of the flowable material a surface of constant concentration of the flowable material.

Other objects and advantages of the present invention will become apparent from the detailed description given hereinafter. The detailed description and specific embodiments are provided for illustration only, since various additions and modifications within the spirit and scope of the invention will become apparent to those of skill in the art from the detailed description.

DESCRIPTION OF PREFERRED EMBODIMENTS

Figure 1:
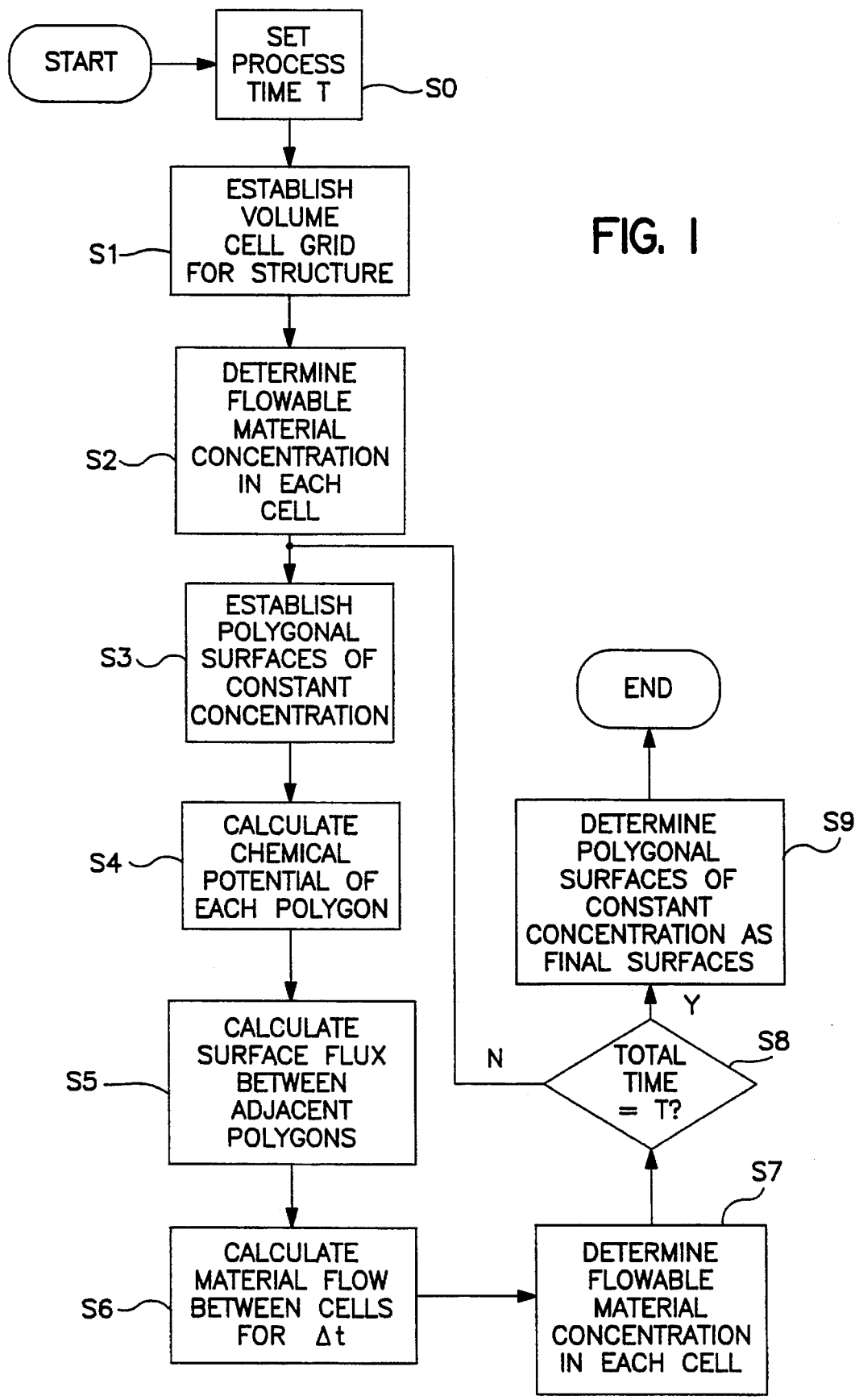
FIG. 1 is a flow chart describing a method in accordance with an embodiment of the invention.
Figure 2:
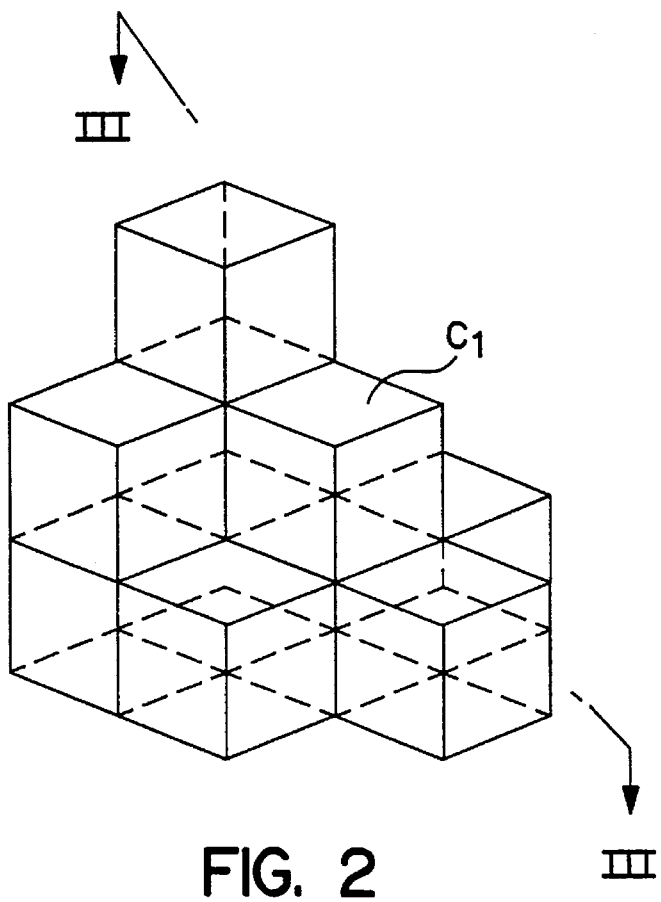
FIG. 2 illustrates division of a volume including a surface of interest into a plurality of volume cells.
Figure 9:
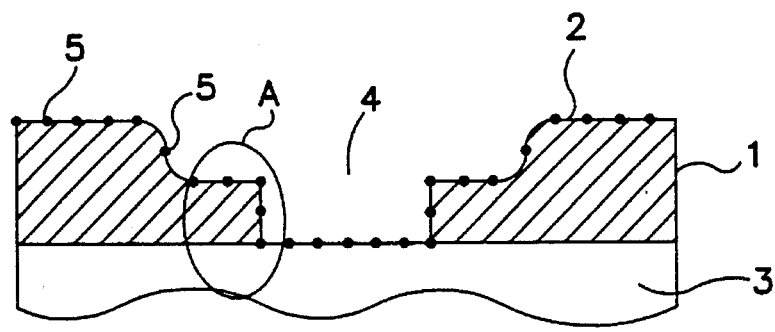
FIG. 9 is a cross-sectional view of a two-dimensional surface to which a prior art topography prediction method is applied.
Figure 10:
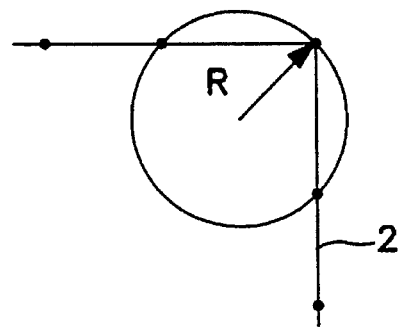
FIG. 10 is an enlarged view of portion A of FIG. 9.
Figure 11:
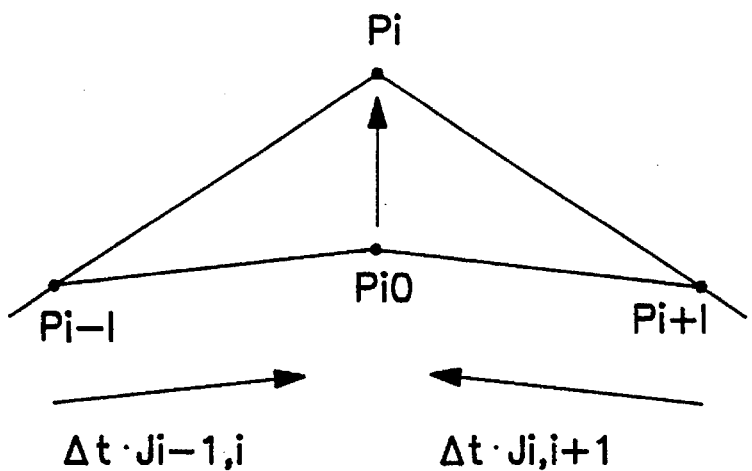
FIG. 11 is an illustration of the movement of a point on a surface as result of a reflow step.
Figure 12:
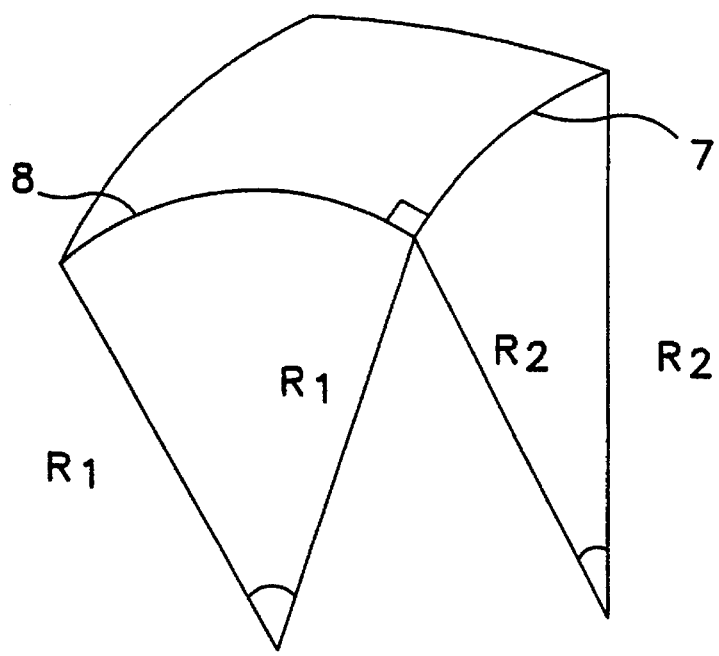
FIG. 12 illustrates radii of curvature used in a known two-dimensional reflow topography method.

FIG. 1 is a flow chart generally illustrating a method according to an embodiment of the invention. The method illustrated in FIG. 1 is described with respect to the other figures. Initially, in step S0, the conditions for the reflow step are specified. These conditions include the temperature and duration T of the reflow. Other variables, such as the diffusion constant of the diffusing species, which is a function of temperature, the flowable material, ambient conditions, and the like, are specified in step S0. Next, in step S1, the volume of the device structure including the flowable material is divided into a plurality of contiguous three-dimensional cells, such as cubes, as a grid to provide reference points much as the points 5 of FIG. 9 are employed for reference in the two-dimensional technique. An example of cubic cells establishing a reference grid is shown in FIG. 2. Some of the cubic cells are entirely filled with a flowable material, some cells do not include any flowable material, and other cells are partially filled with the flowable material. Still other cells are partially or completely filled with a substrate or other environmental elements that are not subject to shape change in response to an elevated temperature but which contact the flowable material before, during, or after the reflow step. Each cell is assigned a value representing the concentration of the flowable material in the cell. For example, a filled cell is given a concentration of 1.0 and a cell thirty percent filled with a flowable material is given a concentration of 0.3. The concentration assignment of each cell is carried out in step S2 of FIG. 1. The cell concentration information is based either upon initial conditions, i.e., a specific structure, or upon the results of a previous iteration predicting a three-dimensional surface topography for a flow during a time increment $\Delta t$, a time increment generally much shorter than T.

Figure 3:
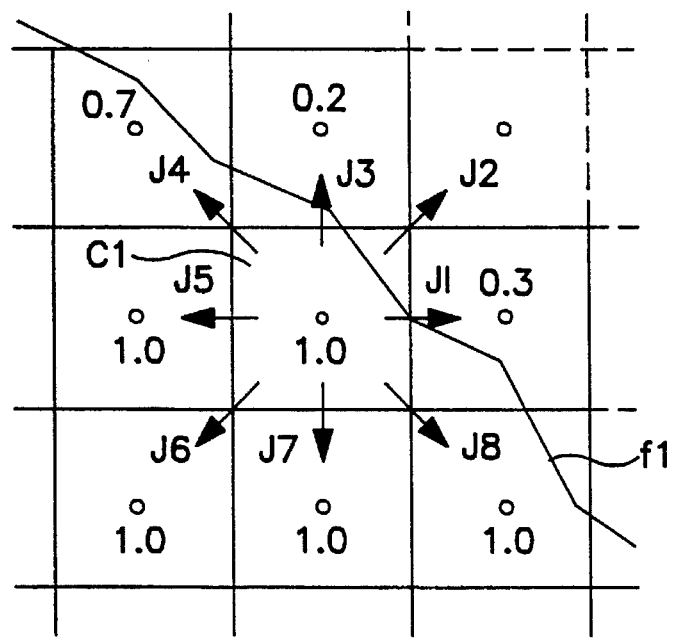
FIG. 3 is a cross-sectional view taken along line III—III of FIG. 2.

As shown in FIG. 3, the concentration value is generally assigned to the center point within each cell. FIG. 3 is a cross-sectional view taken along line III—III of FIG. 2. As shown by the arrows $J_1$–$J_8$ in FIG. 3, fluxes of the flowable material can, under appropriate conditions, flow from one cell to an adjacent cell.

Figure 4:
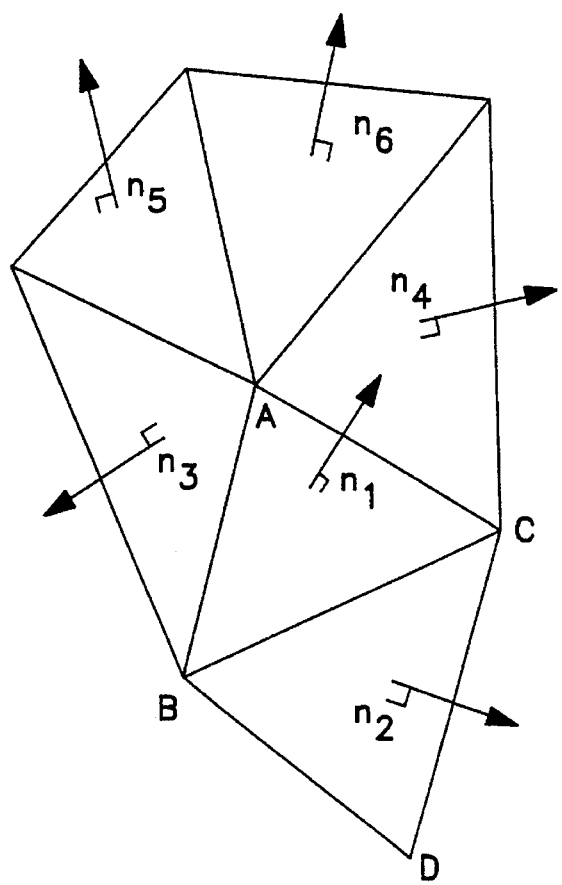
FIG. 4 illustrates an array of contiguous polygons representing surfaces of constant flowable material concentration.

Next, in step S3, polygonal surfaces of constant concentration are drawn amongst and within the cells. The surfaces are determined by linear interpolation between the respective concentrations of the cells. An example of such a surface $f_1$ is shown in an edge view in FIG. 3. Preferably, the linear interpolation produces surfaces of equal concentration composed of triangles or other polygons, such as the triangular areas shown in FIG. 4. Each vertex of each triangle represents the same concentration. In addition, each triangular area has a unit normal vector, such as the respective vectors $n_1$–$n_6$ illustrated in FIG. 4. If the triangles formed a planar surface, all of the normal vectors, which are perpendicular to the respective triangles, would be parallel. The degree to which two normal vectors are not parallel is an indication of the relative slope of the respective surfaces and the strength of the gradient driving diffusion or flow of a material from one surface to an adjacent surface. Generally, when the triangles of FIG. 4 are constructed, a line, such as line BC of FIG. 4, is determined and then adjacent points of the same concentration, such as point A and point D, are determined so that triangles can be completed. Likewise, after that step, when line AC is established, another equal concentration point can be employed to draw the triangle of FIG. 4 having the unit normal vector $n_4$.

Figure 5:
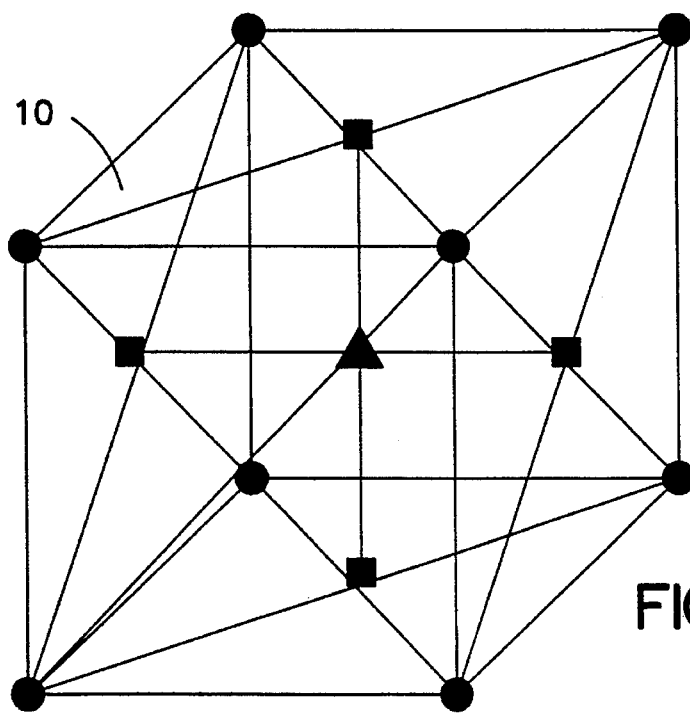
FIG. 5 illustrates a method of establishing polygonal surfaces of constant concentration.

A method of producing the triangular or polygonal constant concentration surfaces is illustrated with respect to FIG. 5. The concentration values for each of the corners of a cell is determined by linear interpolation from the concentrations of each of the eight nearest cells. Then a cell, having had the concentration values at each corner determined, is divided into twenty-four tetrahedrons 10, as illustrated in FIG. 5. (Alternatively, division into six tetrahedrons is possible with each face of the cube forming a base of a tetrahedron. However, asymmetric topography can result in using the six tetrahedrons in subsequent steps.) The concentration values at each of the vertices of each tetrahedron 10 are found by linear interpolation. Then the concentration values on each tetrahedral surface are found, again by linear interpolation. The constant concentration value points that can be connected by a straight line within a tetrahedron are used to describe polygons, i.e., planar triangles and rectangles, that represent constant concentration surfaces. It is these polygons and their surfaces that are shown in FIG. 4.

In step S4 of FIG. 1, the chemical potential of each constant concentration polygon, for example, the triangles ABC and BCD, is calculated to determine the chemical potential gradient driving the reflow diffusion flux. The chemical potential is calculated by hypothesizing that a minute amount of matter is added to or extracted from one of the cells, resulting in a relative change in position of a constant concentration surface of the cell. The corresponding surface moves along, i.e., in the direction of, the respective unit vector of FIG. 4. The change in free surface energy dF resulting from adding an $\epsilon$ of matter has already been described as $$dF=\gamma dA=\mu dN.$$

Figure 6:
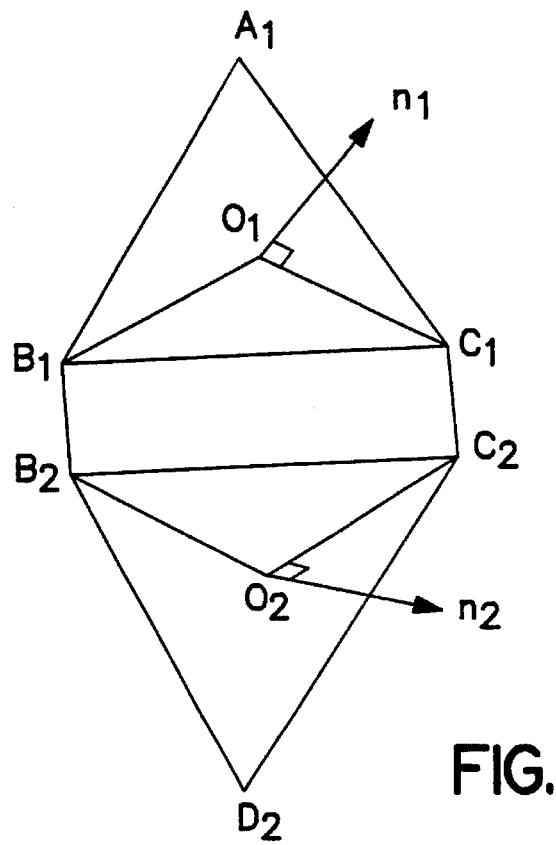
FIG. 6 illustrates a method of determining the chemical potential gradient between two adjacent surfaces of constant concentration.

This equation can be rewritten as $$\mu=\gamma(dA/dN)=\gamma(dA/dV)\cdot(dV/dN)=(\gamma/\rho)\,(dA/dV) \quad (1)$$

where dV is the increased volume as a result of the added matter and $\rho$ is the surface density of the atoms or molecules flowing, i.e., equal to the reciprocal of $\Omega$. Because the unit vectors $n_1$ and $n_2$ of the triangles ABC and BCD are not parallel to each other and the added material causes the two triangles to move along their respective normal vectors, a splitting of the common boundary BC of the two triangles ABC and BCD occurs, producing the quadrilateral area $B_1B_2C_2C_1$ illustrated in FIG. 6. That increase in area dA is proportional to the product of the length of line BC, the difference between the unit normal vectors of the respective triangles $n_1$ and $n_2$, and $\epsilon$, the amount of added matter, i.e., $$dA=|(n_1-n_2)BC|\epsilon.$$

(The described example presumes that both unit vectors are positive. If at least one of the vectors is negative, the triangles ABC and BCD would converge rather than diverge upon the addition of material $\epsilon$, i.e., dA/dV would be negative, the triangles would overlap, and area would be reduced instead of being added.)

The resulting increase in the volume dV is $\epsilon A_o$ where $A_o$ is the sum of the areas of the triangles $O_1B_1C_1$ and $O_2B_2C_2$ where $O_1$ and $O_2$ are the centers, i.e., centroids, of the triangles $A_1B_1C_1$ and $B_2C_2D_2$, respectively. Thus, based upon the increase in area per unit volume for the added material, dA/dV, the chemical potential $\mu$ of equation 1 is calculated. A precise calculation of the chemical potential of the respective triangles requires a similar calculation not only with respect to one adjacent triangle, i.e., triangle BCD for triangle ABC, but also for the other triangles or other polygons that are contiguous with the triangle ABC.

Based upon the chemical potential thus calculated, the surface flux, i.e., the diffusive reflow of material between cells can be calculated. For example, referring to FIG. 3, fluxes $J_1$–$J_8$ within a plane are shown. In addition, fluxes $J_9$–$J_{17}$ may flow to or from adjacent cells in a plane on one side of the plane illustrated in FIG. 3 and fluxes $J_{18}$–$J_{26}$ may flow to or from cells in a plane on the opposite side of the place shown in FIG. 3. Each flux is calculated from the Nernst-Einstein relation, namely, $$J=v\nabla_s=v(-(D/kT)\nabla\mu)=-v((D/kT)(\gamma/\rho)\,\nabla(dA/dV)).$$

Figure 7:
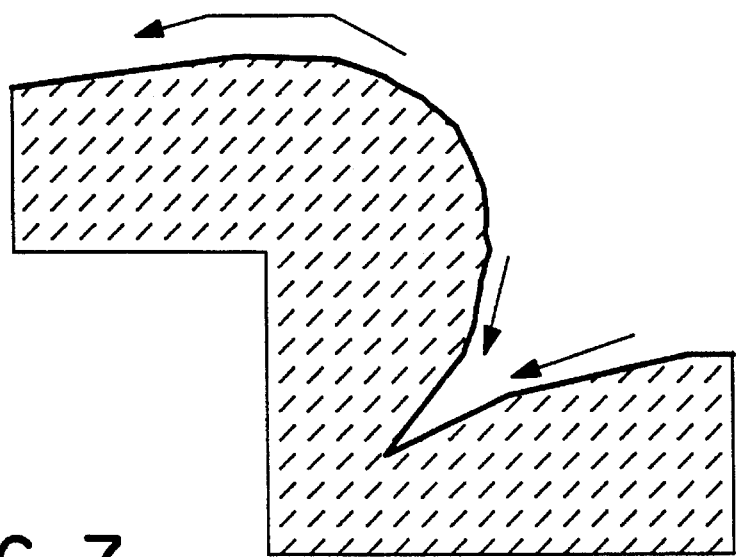
FIG. 7 is a cross-sectional view illustrating diffusive material flow.
Figure 8:
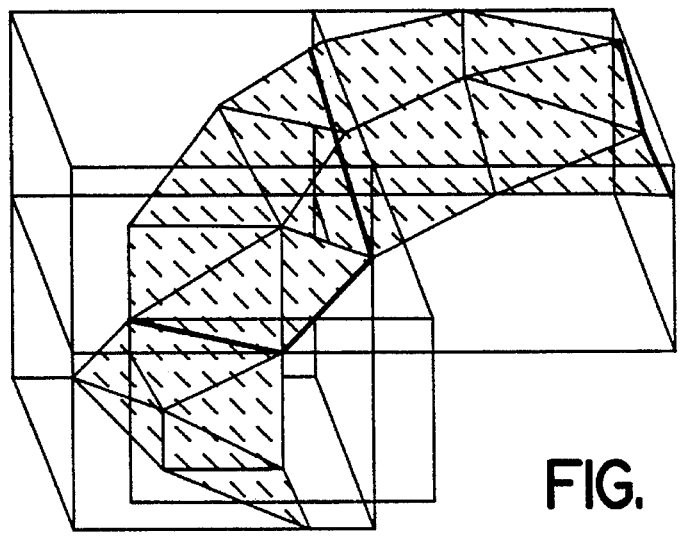
FIG. 8 is a view illustrating three-dimensional diffusive material flow.

This flux calculation is step S5 in the flow chart of FIG. 1. Generally, the material flow J represents an instantaneous flux. By multiplying the instantaneous flux by the time interval $\Delta t$, which is a relatively short time period, typically much shorter than the total process time T, the total material flow into and out of each cell during $\Delta t$ is determined. After that determination, the flowable material concentration in each cell is determined again based upon the change, if any, of the flowable material in each respective cell at step S7 of FIG. 1. In the reflow process, flowable material diffuses from regions of larger chemical potential, i.e., larger curvature, to regions of smaller chemical potential, i.e., smaller curvature. In other words, the diffusive flow tends toward forming a planar surface topography. This flow is illustrated in two dimensions in FIG. 7 and is illustrated in FIG. 8 for three dimensions. In FIG. 8, the bold lines indicate cell boundaries across which material flows since each flow between polygonal surfaces does not necessarily represent an intercellular material flow.

After an iteration representing time $\Delta t$, it is determined in step S8 whether the entire process for which a surface topography is being predicted has been completed. This determination is made by comparing the duration of the complete process with the time interval $\Delta t$ of the current iteration combined with the time intervals for all previous iterations. If, at step S8, the time comparison indicates that the total process time T has not been reached, then the iteration just described is repeated as many times as necessary until the process is completed. This repetition is carried out by transferring from step S8 of FIG. 1 back to step S3, using the results of step S7 as the material concentration information. If, at step S8, it is determined that the iterations providing a prediction of the surfaces that will result from the completed reflow process have been carried out, then, at step S9, the uniform concentration surfaces are determined for the cells and that surface is the predicted, final surface topography resulting from the reflow process. That surface may be drawn with the aid of computer graphics equipment to produce views like those of FIGS. 13(b) and 13(c) so that a determination can be made as to whether a desired three-dimensional topography is achieved. If the desired result is not achieved, then changes in processing conditions can be made in order to produce the desired result.

Figure 13A:
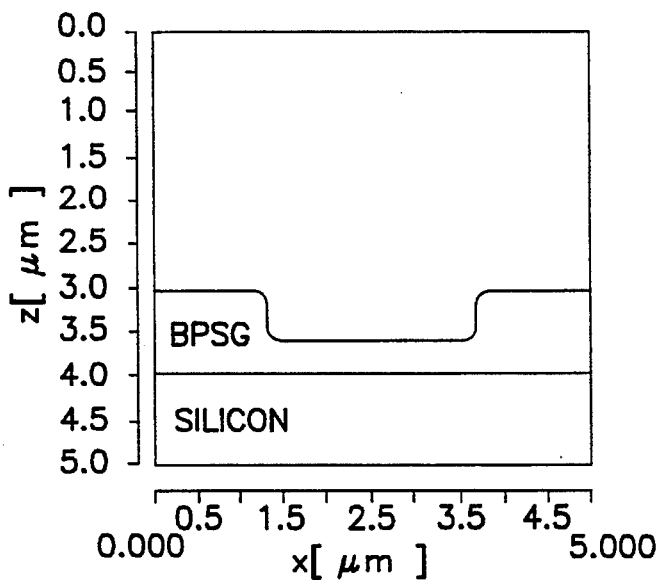
FIGS. 13(a)–13(c) are a sectional view of an initial topography and sectional and plan views of a final topography predicted according to the invention.
Figure 13B:
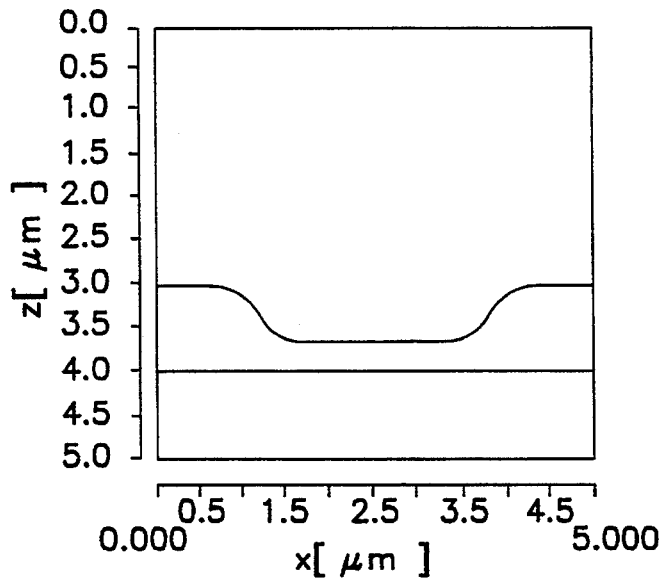
Figure 13C:
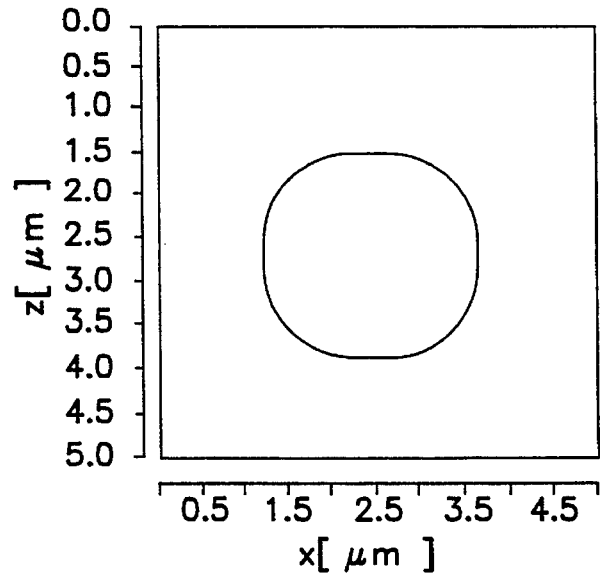
Figure 14C:
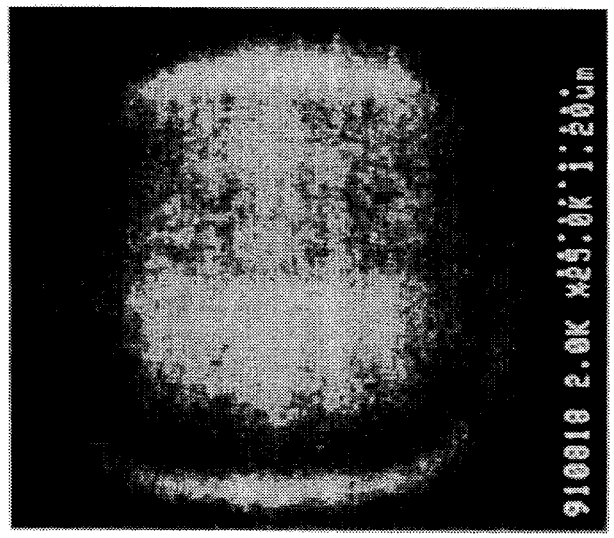
FIGS. 14(a)–14(c) are a sectional micrograph of an initial topography and sectional and plan micrographs of a final topography observed after a reflow process.
Figure 14B:
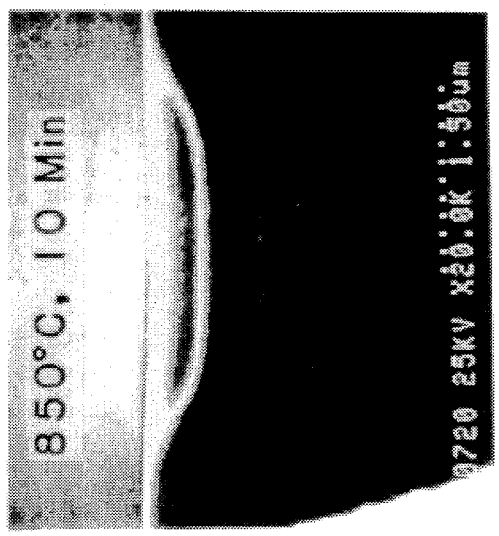
Figure 14A:
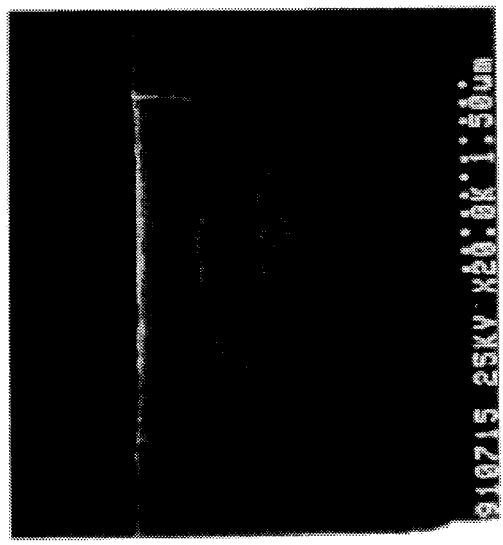

A comparison of a three-dimensional topography predicted according to the invention and measured results are shown in FIGS. 13(a)–13(c) and FIGS. 14(a)–14(c), respectively. FIGS. 13(a)–13(c) are computer-generated drawings of initial and post reflow topographies as predicted according to the invention and FIGS. 14(a)–14(c) are scanning electron micrographs of the same topographies as actually observed. In this comparison, a BPSG layer was deposited on a planar silicon substrate. Thereafter, a square hole 2.4 microns on a side was formed in the BPSG layer to a depth of 0.5 micron, i.e., less than the total thickness of the BPSG layer. The temperature of the substrate was raised to 850° C. for ten minutes in a nitrogen atmosphere. The initial planar BPSG layer with the hole is depicted in sectional predicted and observed views in FIGS. 13(a) and 14(a), respectively. The topography after the reflow processing is shown in sectional and plan views, respectively, as predicted, in FIGS. 13(b) and 13(c) and, as observed, in FIGS. 14(b) and 14(c). These figures show that the three-dimensional prediction according to the invention, predicting that the square hole corners become round and that the hole side walls become oblique, is in excellent agreement with actual, observed results, demonstrating the accuracy and usefulness of the method.

I claim:

1. A method of controlling reflow of a flowable material to produce a desired three-dimensional topography of the flowable material comprising:

establishing reflow process conditions including a total process time;

establishing a grid of three-dimensional cells encompassing at least part of a semiconductor device and including a flowable material;

specifying the concentration of the flowable material in each cell;

establishing polygonal surfaces of constant flowable material concentration that extend amongst the cells;

calculating the chemical potential of each constant concentration polygonal surface;

calculating the surface flux of the flowable material between adjacent polygonal surfaces;

calculating the material flow between cells for a time interval $\Delta t$ less than the total process time by multiplying the surface flux by the time $\Delta t$;

determining the flowable material concentration in each cell after the material flow;

repeating the foregoing steps from establishing the polygonal surfaces of constant concentration through determining the flowable material concentration in each cell for successive time intervals $\Delta t$ until the sum of the time intervals reaches the specified process time;

establishing as a three-dimensional surface of the flowable material a surface of constant concentration of the flowable material;

comparing the three-dimensional surface of the flowable material with a desired three-dimensional surface of the flowable material and, if the three-dimensional surfaces are different, changing the reflow process conditions and repeating the foregoing steps from establishing a grid of three-dimensional cells through establishing the three-dimensional surface of the flowable material; and reflowing the reflowable material under the process conditions determined in the foregoing steps that produced a three-dimensional surface that coincided with the desired three-dimensional surface.

* * * * *

UNITED STATES PATENT AND TRADEMARK OFFICE
CERTIFICATE OF CORRECTION

PATENT NO. : 5,471,403
DATED : November 28, 1995
INVENTOR(S) : Fujinaga

It is certified that error appears in the above-indentified patent and that said Letters Patent is hereby corrected as shown below:

Title page,
Item 75: change "Fujimaga" to --Fujinaga--.

Signed and Sealed this

Fourth Day of June, 1996

*Attest:*

BRUCE LEHMAN

*Attesting Officer    Commissioner of Patents and Trademarks*